United States Patent

[11] 3,558,097

[72] Inventor Joseph H. DeFrees
 414 Liberty St., Warren, Pa. 16365
[21] Appl. No. 729,661
[22] Filed May 16, 1968
[45] Patented Jan. 26, 1971

[54] VALVE
 8 Claims, 9 Drawing Figs.
[52] U.S. Cl................................................ 251/88,
 251/357; 137/608, 137/271
[51] Int. Cl....................................................... F16k 25/00
[50] Field of Search........................................... 251/84, 86,
 88, 332, 333, 334, 356, 357; 137/561, 271, 608

[56] References Cited
UNITED STATES PATENTS

| | | | |
|---|---|---|---|
| 1,061,556 | 5/1913 | Osborne | 251/88 |
| 1,733,180 | 10/1929 | Biedermann | 251/357X |
| 2,107,200 | 2/1938 | Kennon | 251/332 |
| 3,009,476 | 11/1961 | Usab | 251/332X |
| 3,263,961 | 8/1966 | Varga | 251/332 |
| 2,868,457 | 1/1959 | Currie et al. | 251/334X |
| 2,959,392 | 11/1960 | Von Platen et al. | 251/332 |
| 2,573,263 | 10/1951 | Jensen | 137/271 |

FOREIGN PATENTS

| | | | |
|---|---|---|---|
| 11,477 | 9/1886 | Great Britain | 251/88 |

Primary Examiner—Henry T. Klinksiek
Attorney—Baldwin, Egan, Walling & Fetzer

ABSTRACT: A fluid discharge control valve for an outlet port of a fluid storage tank. The valve includes a manifold body with an inlet tube positioned in one side of the body, with the outer end of such tube being connected to the tank outlet port. The inlet tube has a valve seat on its inner end. A valve mounting tube is disposed on an opposed side of the manifold body opposite the inlet tube. A valve assembly is secured to the outer end of the valve mounting tube and extends into the body. Such valve assembly includes a valve disc selectively engageable with the valve seat to control fluid flow thereby. The valve disc has an annular groove formed in its surface opposite said seat, such groove containing a sealing gasket engageable with the valve seat. The gasket, in cross-sectional configuration, has an air cavity disposed in the surface opposite the sealing surface to provide a bubble-tight seal at low sealing pressures. The manifold body is formed of stock material rectangular in cross-sectional configuration.

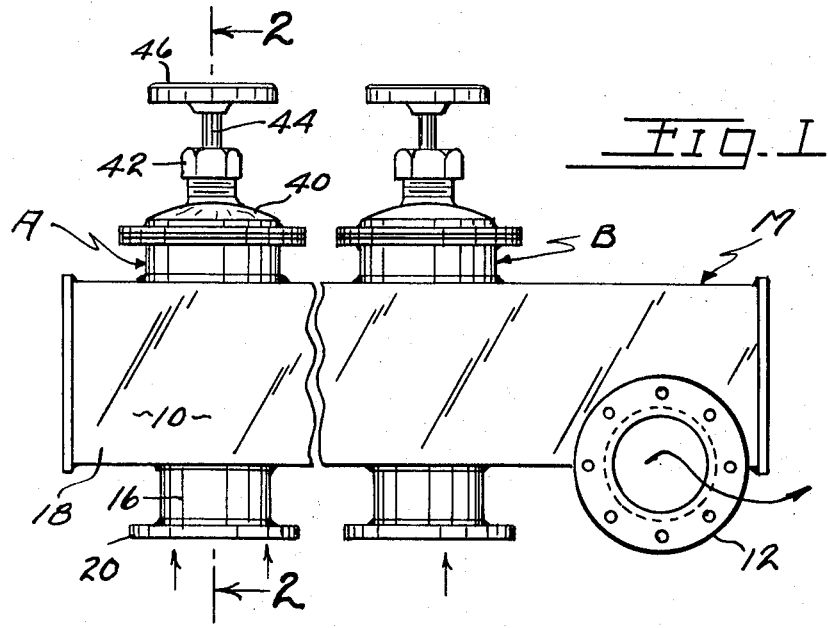
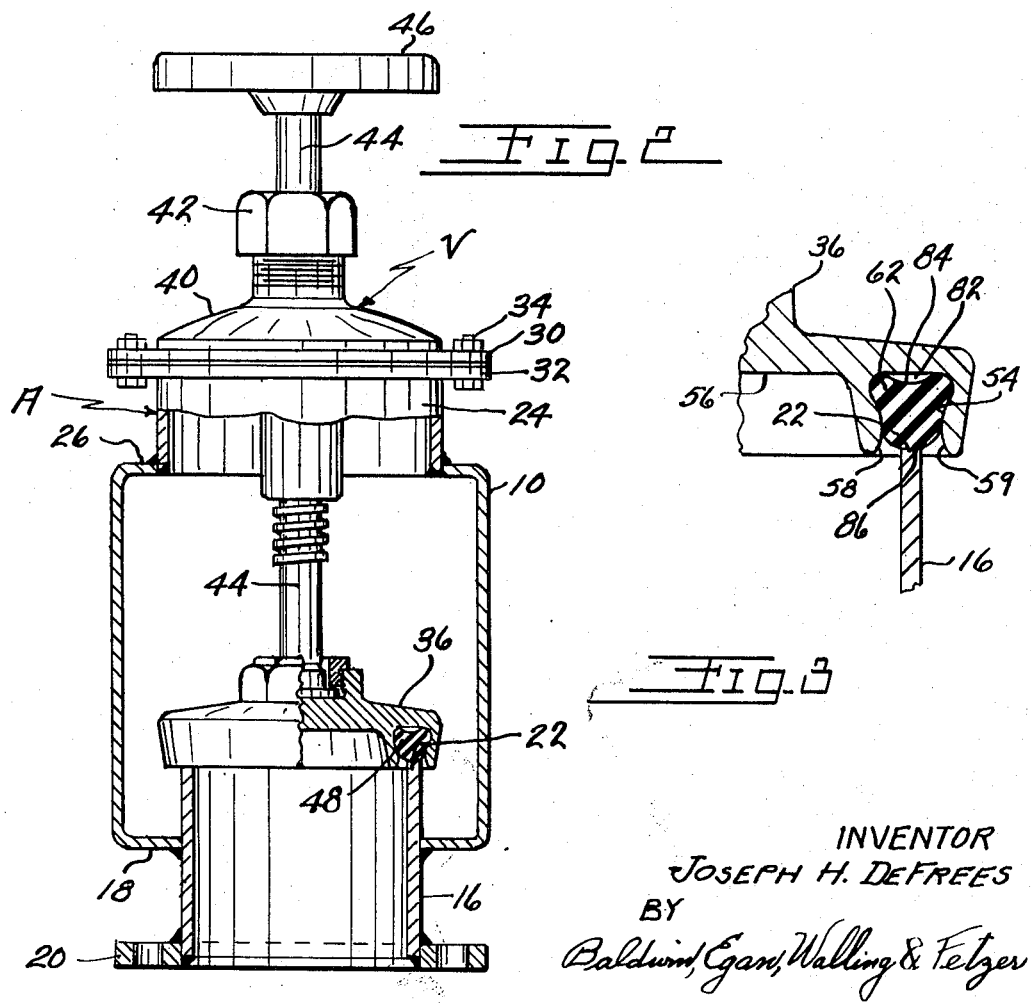
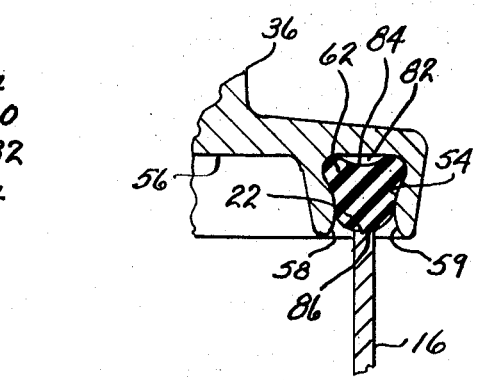

VALVE

This invention relates to valves and more particularly to fluid discharge manifold valves used in connection with tanks or containers for the storage or transportation of fluids.

The outlet opening of liquid storage or transportation tanks must be equipped with simple, efficient valves of few parts and provided with gaskets that effect a tight seal over long periods of time and under a wide variety of weather conditions. In such valves, there cannot be any pockets or cavities in which the liquid product may collect and thus intermingle with subsequent loads. Not only would such intermingling be dangerous, but could be most objectionable from a contamination standpoint. Additionally the valve must be readily removable exteriorly of the tank whereby all valve parts in contact with the product are readily accessible.

Therefore, it is an object of the invention to provide a liquid storage tank outlet valve that effects a tight seal for an extended period of time and under all weather conditions.

A further object of the invention is to provide a valve of the above type having a groove-sealing gasket structure forestalling premature deterioration of the gasket.

A further object of the invention is to provide a valve of the above type having a groove-sealing gasket structure wherein the gasket is securely retained in the groove and will not be dislodged therefrom even under abnormal operating conditions.

A further object of the invention is to provide a valve of the above type constructed so that water, ice, dirt or the product being stored cannot collect in the groove-sealing gasket structure or in the valve and adjacent structure.

A further object of the invention is to provide a valve of the above type removable from operative position exteriorly of the tank.

A further object of the invention is to provide a valve of the above type that is simple in construction, inexpensive to manufacture and highly effective in operation.

Briefly, the foregoing objects are accomplished by the provision of a fluid discharge control valve for an outlet port of a fluid storage tank including a manifold body with an inlet tube positioned in one side of the body, with the outer end of such tube being connected to the tank outlet port. The inlet tube has a valve seat on its inner end. A valve mounting tube is disposed on an opposed side of the manifold body opposite the inlet tube and contains a valve assembly which is secured to the outer end of the valve mounting tube and extends into the manifold body. Such valve assembly includes a valve disc selectively engageable with the valve seat to control fluid flow thereby. The valve disc has an annular groove formed in its surface opposite the valve seat, such groove containing a sealing gasket engageable with the valve seat. The outer portions of the sidewalls of the groove converge slightly toward each other to form a V-shaped groove in cross-sectional configuration. The gasket, in cross-sectional configuration, has an air cavity disposed in the surface opposite the sealing surface to provide a bubble-tight seal at low sealing pressures. Such gasket may be V-shaped, Y-shaped, etc., in cross-sectional configuration whereby the legs of the gasket extend upwardly and outwardly into the groove for secure retention therein. The manifold body is formed of economical stock material rectangular in cross-sectional configuration.

Other objects and advantages of the invention will be apparent from the following description taken in conjunction with the drawings wherein:

FIG. 1 is a top plan view of a liquid transportation tank manifold and valve structure embodying the present invention;

FIG. 2 is an enlarged view, partly in section, taken along the line 2–2 of FIG. 1;

FIG. 3 is an enlarged broken sectional view of the groove-sealing gasket structure shown in FIG. 2 and showing a dovetail type gasket;

Figure 4:
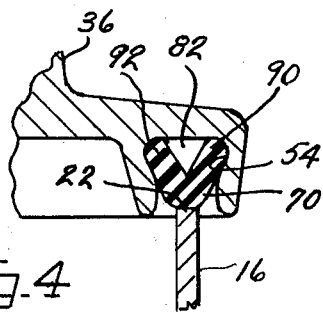
FIG. 4 is a view similar to FIG. 3, but showing a V-type gasket.

Although the invention is shown and described herein with reference to fluid storage tank valves, it will be understood that it may be applied to any type of valve for controlling the flow of fluid.

Referring first to FIG. 1, there is shown a liquid storage tank manifold M incorporating the invention. M includes a manifold body 10 having a plurality of identical fluid flow control means or cross-valves A and B incorporated therein. The manifold also includes an outlet connection 12.

The manifold M constitutes a cross-valve header structure normally disposed beneath a multicompartment fluid storage tank for gasoline or oil transportation. Specifically, a conventional tank truck is provided with a series of compartments separated by bulkheads. Each compartment is provided with a bottom outlet opening leading to the manifold and thence controlled by a so-called cross-valve A or B. The valves are shown as arranged horizontally in a longitudinal series along the manifold, and it will be apparent that any one or more valves may be operated to permit individual discharge from any one selected compartment, or simultaneous discharge from more than one.

Referring now to FIG. 2, the valve A includes the hollow manifold body 10 with a hollow open ended inlet tube 16 positioned in one side 18 of the manifold body, with the outer end of such inlet tube adapted to be secured to a tank outlet port by means of the flange 20. The inner end of the inlet tube 16 forms a valve seat 22. A valve mounting tube 24 is disposed in the opposed side 26 of the manifold body 10 opposite the inlet tube 16.

A valve assembly V is secured to the outer end of the valve mounting tube 24 by means of the flanges 30 and 32 and the bolts 34, such valve assembly extending into the manifold body 10 and including a valve disc 36 selectively engageable with the valve seat 22 to control fluid flow thereby as will be hereinafter described in detail. Valve A has no cavities in which fluid may collect.

The valve assembly V comprises a head cap 40 secured to the outer end of the valve mounting tube 24 by the flanges 30, 32 and the bolts 34 as aforedescribed. The head cap 40 contains a conventional stuffing box 42 disposed centrally on the cap. An elongated valve stem 44 is rotatively disposed in the cap and stuffing box in the usual manner with the inner end of the stem being disposed adjacent and spaced from the inner end of the inlet tube 16. The outer end portion of the stem 44 extends outwardly of the manifold body 10 and outwardly of the cap 40 and has the usual handle 46 on the outer end thereof. The valve disc 36 is rotatively secured to the inner end of the stem 44 in conventional manner. This construction evens out wear on the gasket 48. Thus, the disc 36 (through the gasket 48) is adapted to selectively contact the valve seat 22 with a sealing fit when the stem is rotated in one direction about its longitudinal axis.

Figure 5:
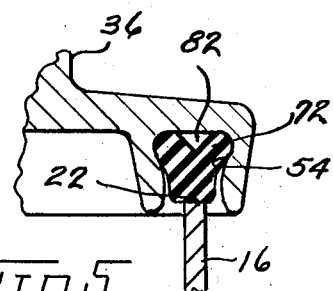
FIG. 5 is a view similar to FIG. 3, but showing a Y-type gasket.
Figure 8:
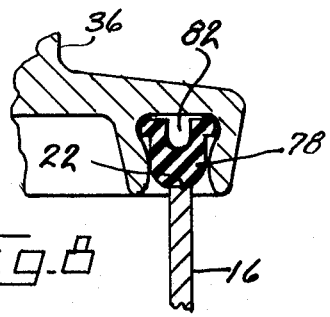
FIG. 8 is a view similar to FIG. 3, but showing a U-type gasket.
Figure 6:
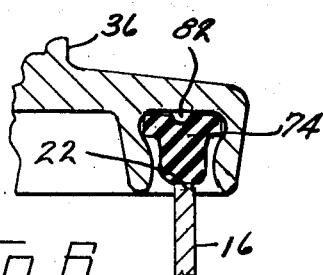
FIG. 6 is a view similar to FIG. 3, but showing a T-type gasket.
Figure 7:
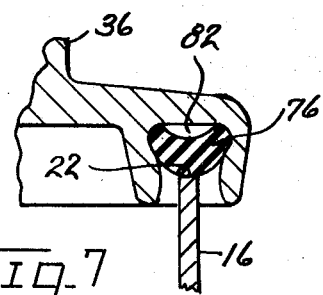
FIG. 7 is a view similar to FIG. 3, but showing a crescent type gasket.
Figure 9:
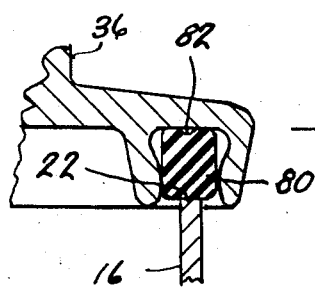
FIG. 9 is a view similar to FIG. 3, but showing a rectangular type gasket.

Referring now to FIG. 3, the disc 36 has an annular partially V-shaped (in cross-sectional configuration) gasket. groove 54 formed in its side 56 opposite the seat 22. The groove, in the present instance, is formed by a pair of spaced legs or groove side 58 and 59 which converge slightly toward each other to form such V-shaped groove 54. Disposed in the groove 54 is a dovetail-shaped resilient gasket 62. Any type gasket having upwardly and/or outwardly extending arms or legs adapted to fit into the V-groove 54 may be used such as, for example, the V-shaped gasket 70 of FIG. 4, the Y-shaped gasket 72 of FIG. 5, the T shaped gasket 74 of FIG. 6, the crescent-shaped gasket 76 of FIG. 7, the U-shaped gasket 78 of FIG. 8, and the rectangular-shaped gasket 80 of FIG. 9. It will be noted that all of such gaskets have a recess or air space 82 centrally disposed in the surface 84 (FIG. 3) opposite the sealing surface 86 to provide a bubble-tight seal at low sealing pressures, such being a feature of the invention.

Insertion of the gasket into the groove 54 is effected by pressing the upwardly and/or outwardly extending arms or legs 90 and 92 (as shown in FIG. 4, for example) together and inserting such gasket entirely into the groove.

Again, it will be noted that the valve A is cavitiless in that there are no pockets or cavities in which the stored fluid may collect.

I claim:

1. A fluid discharge control means for an outlet port in a fluid storage tank comprising, a hollow manifold body of substantially inexpensive rectangular stock material, a hollow open ended inlet tube positioned in one side of the manifold body with the outer end of the inlet tube adapted to be secured to the tank outlet port, said inlet tube having an annular valve seat on its inner end, a valve mounting tube disposed in an opposed side of the manifold body opposite the inlet tube, a cavitiless valve assembly secured to the outer end of the valve mounting tube and extending into the body and including a head cap secured to the outer end of the valve mounting tube, said head cap having a stuffing box disposed centrally thereon, an elongated valve stem rotatively disposed in the stuffing box with the inner end of the stem being disposed adjacent and spaced from the inner end of the inlet tube, the outer end of the stem extending outwardly of the manifold body and head cap and having a handle thereon, a valve disc rotatively secured to the inner end of the stem and adapted to selectively engage said valve seat to control fluid flow thereby when said stem is rotated in one direction about its longitudinal axis, said valve disc having an annular groove formed in its side opposite said seat, and an annular gasket disposed in said groove and having a sealing surface centrally disposed on the gasket and adapted for sealing contact with said valve seat, said gasket in cross-sectional configuration having an air space centrally disposed in the surface opposite its sealing surface to provide a bubble-tight seal at low sealing pressures, said air pocket being disposed directly opposite said valve seat, the sidewalls of the groove first converging slightly toward each other, thence diverge away from each other to the groove opening to form a partial V-shaped groove in cross-sectional configuration to retain the gasket therein and preclude separation of the gasket from such groove.

2. The structure of claim 1 wherein said gasket is substantially V-shaped in cross-sectional configuration.

3. The structure of claim 1 wherein said gasket is substantially Y-shaped in cross-sectional configuration.

4. The structure of claim 1 wherein said gasket is substantially T-shaped in cross-sectional configuration.

5. The structure of claim 1 wherein said gasket is crescent-shaped in cross-sectional configuration.

6. The structure of claim 1 wherein said gasket is substantially U-shaped in cross-sectional configuration.

7. The structure of claim 1 wherein said gasket is rectangular-shaped in cross-sectional configuration.

8. The structure of claim 1 wherein said manifold body is formed of stock material rectangular in cross-sectional configuration.